UNITED STATES PATENT OFFICE.

ORLANDO JONES, OF CITY ROAD, ENGLAND.

IMPROVEMENT IN THE MANUFACTURE OF STARCH.

Specification forming part of Letters Patent No. 2,000, dated March 12, 1841.

*To all whom it may concern:*

Be it known that I, ORLANDO JONES, a subject of the Queen of Great Britain, and now residing in the City Road, in the county of Middlesex, accountant, in the Kingdom of Great Britain, have invented or discovered new and useful improvements in treating or operating on farinaceous matters to obtain starch and other products, and in the manufacture of starch; and I, the said ORLANDO JONES, do hereby declare the nature of my said invention and the manner in which the same is to be carried into effect are fully described in and by the following statement thereof—that is to say:

All substances containing starch are composed of vegetable matters besides the starch itself, and in the manufacture of starch it is desirable to separate it from the other vegetable matters with as little waste of or injury to the starch as possible, and in such manufacture as at present generally practiced (although other processes have been used) it is usual to steep the substance from which starch is to be obtained for some weeks in water for the purpose of separating by fermentation the starch from the other matters, and by such process not only is the starch or a portion of it injured, but a considerable portion of it is retained in the other products, and such other products, with the starch associated therewith, (usually more than one-half of the whole weight of the substance employed,) are of comparatively little value, owing to the fermentation through which they have passed. Now, by my invention not only may a larger product of starch of the best character be obtained from a given quantity of wheat or other substance containing starch, but the time expended in the production of it is materially shortened; and, further, some of the other products of the substance employed can be obtained fit for use from their not having gone through the process of fermentation, and thus they will be found suitable, with an admixture of wheaten or other flour, for the making of bread, biscuit, and other preparations of food; and, particularly, I am enabled to apply my invention to rice, which has not hitherto been rendered practically available as a source of starch, so as to obtain starch of good quality; and, further, by subjecting rice to part of my treatment or operation, as hereinafter explained, I can obtain as a product a flour or powder divested of its harsh character, and more resembling wheaten or ordinary flour in appearance and to the touch, which flour or powder is applicable to various useful purposes to which starch of a low quality could be applied; and, indeed, it may at once be used as a low-quality starch itself, whether for distillation, stiffening fabrics, making paste, or other such like purposes, and which may be also useful as an article of food. I will here generally state that my invention relates to a mode of heating or operating on farinaceous matters to obtain starch and other products, and for manufacturing starch by means of submitting such farinaceous matters to a caustic alkaline process, as hereinafter more particularly explained. I would observe, however, that I have not yet found that my invention can be applied with advantage in the manufacture of starch from potatoes.

In order that my invention may be fully understood and readily carried into effect, I will proceed to describe the process as practiced by me, and which, so far as my experience goes, I have found the best for effecting its object, and as I find the most advantageous results of my invention are from its application to rice I will first describe the method of applying it thereto.

I find it convenient to have the following vessels: No. 1, one or more vessels of iron, tinned or copper-lined, or such vessels may be of stoneware, wherein to macerate the rice in a caustic alkaline solution previous to grinding, as hereinafter explained, and also for washing the rice after the process of maceration. I would observe that no vessels ought to be used liable to be materially acted upon by the alkali. No. 2, one or more vessels of iron, tinned or copper-lined, or of stoneware, wherein to macerate the rice-flour in a caustic alkaline solution, as hereinafter explained. No. 3, one or more vessels of wood, wherein the deposit of the starch is effected. No. 4, one or more vessels of wood, wherein the deposit of the gluten and other matters combined with the caustic alkaline solution is effected. No. 5, one or more vessels of wood to contain the water after washing the rice, as stated above.

First. I procure or make by the well-known methods described in chemical works a solution of either caustic soda or caustic potash in water, and by means of a test acid, which will be found described under the head of "Alkalimetry" in chemical works, I ascertain with great care the exact percentage of water and caustic alkali—that is, real soda or real potash—contained in the solution, and I dilute it till I find the solution to contain about two hundred grains of real soda or real potash to the gallon. To every fifty gallons of this caustic alkaline solution which I put into a vessel (No. 1) I add one hundred pounds of rice and allow it to macerate from twenty to twenty-four hours.

Secondly. When the maceration has been performed, as above explained, I draw off as much of the alkaline solution as possible into a vessel, (No. 4.) This may be done by means of a tin siphon or of a tinned tap fixed at the bottom of the vessel. The end of the tap which is inside the vessel should be covered with a piece of finely-perforated tin or other strainer to prevent the rice passing through with the liquor. I then pour as much cold water on the rice in vessel No. 1 as will be equal to twice the quantity of alkaline solution taken off. After stirring the rice and water well the water is drawn off by the same means as before described into vessel No. 5. This latter process, which I call "washing the rice," is for the purpose of freeing it from the caustic alkaline solution. The rice is then removed into sieves to drain.

Thirdly. When the rice has done draining, which can be ascertained by its ceasing to drip, I reduce it to flour by crushing or grinding it with rollers or millstones, or by other mechanical means used for such purposes. The flour is then passed through sieves by means of brushes, and the particles which will not pass through a sieve (called by sieve-makers a "coarse-silk sieve") should be returned to the crushing or grinding machine to be reduced sufficiently fine, and then passed through the sieves until the whole (except a small portion of the outer skin or bran, which is refuse) is thus disposed of.

Fourthly. I proceed to macerate the flour thus obtained, for which purpose I put into a vessel (No. 2) a solution of caustic alkali of the strength before named, (about two hundred grains of real soda or real potash to the gallon,) and to every one hundred gallons of this caustic solution I add one hundred pounds of the rice-flour, taking care to stir it gradually into the solution until it is uniformly mixed, leaving no portion knotty or partially damped. Into this mixture I put any deposit which may have taken place in vessel No. 5, (wherein the water with which the rice was washed has been put,) which deposit is obtained by drawing off the water therefrom by a siphon or by taps or other obvious means. The contents of vessel No. 2 should be stirred up together repeatedly during twenty-four hours, and then allowed to stand for about seventy hours to settle or deposit. The process of this deposit is as follows: The first deposit is composed of fibrous matters with a little starch; the second is starch. The gluten, with traces of other matter, is held in combination with or in solution in the caustic alkaline liquid, which in consequence is of a brownish-yellow color more or less turbid. When the starch is deposited (which may be ascertained by drawing off from time to time a portion of the liquid into a glass, when, if any starch remains suspended, it will be easily detected, and further time must be allowed for the deposit) I draw off the brownish-yellow liquor or caustic alkaline solution (which is at the top) into vessel No. 4 without disturbing the starch, for which purpose I use a tin siphon. A quantity of water, equal to about twice the bulk of caustic alkaline solution taken off, is now to be poured onto the deposit in vessel No. 2 for the purpose as well of washing out the alkali as for drawing off the starch from the other matters, and the whole well stirred up. This liquor is to be allowed to rest about an hour, when the matters other than starch (which deposit much quicker than the starch) will subside, carrying therewith a small portion of the starch, but will leave by far the greater bulk of the starch suspended in the liquor. The liquor thus containing the starch I then draw off by means of a tin siphon, passing it through sieves (such as are commonly used by starch-makers and called by sieve-makers "fine-silk sieves," in order to remove any small portion of outer skin or bran) into a vessel, (No. 3.) In drawing off I commence at the top of the liquor, keeping the end of the siphon about an inch under the surface till I come to the liquor containing principally other matters than starch, which may be determined at any time by running a little of it into a glass vessel, when, if it contain any of the other matters insoluble in the caustic alkaline solution, the same will soon subside and become apparent. When I have drawn off the liquor containing the starch I pour into the vessel No. 2 (containing the other matters) a quantity of water equal to about one-third of the starch-liquor drawn off, and stir it up, and allow them again to subside and draw off, as already described. The process of adding more water, of stirring up, of allowing to subside, and of drawing off may be repeated till the whole, or nearly the whole, of the starch is drawn off from the other matters, as before described. The starch-liquor in No. 3 is then to be allowed about seventy hours to settle or deposit, and after the deposit has taken place, which may be ascertained by the means before described, the waste liquor is to be drawn off and the starch stirred up, blued, (if thought necessary,) drained, dried, and finished in the usual way.

I have described above the mode of obtaining the best quality of starch; but I propose to procure a lower or secondary quality by the following processes:

In one process I macerate the rice, wash it, drain it, grind it, pass the flour through sieves, macerate the flour, and wash the starch, as in the preceding process; but instead of drawing off the starch while in suspension by means of a siphon from the other matters mixed with it in vessel No. 2, I simply strain the mixture (after well stirring it) into vessel No. 3 through a fine silk sieve, before described, so as to remove any small portion of outer skin or bran or other matter, and treat the starch as in the preceding process.

In another process of obtaining starch of a lower or secondary quality I proceed as follows: I macerate the rice, as before described in the process for making starch of the first or best quality, and draw off the caustic alkaline solution after the lapse of about twelve hours. The same quantity and strength of fresh caustic alkaline solution is then added to the rice and allowed to remain for the same time, and is drawn off as before. This operation is repeated three or four times until as much of the gluten or coloring-matter is removed as may be desired. The rice is then to be washed, drained, dried, and ground into flour, and the flour is to be passed through sieves, as before, to remove any small portion of outer skin or bran, and the flour thus procured may be used as starch of an inferior quality. This inferior starch may be used not only for the purpose of stiffening fabrics, but also for that of distillation, making paste, and, in short, for all purposes to which a low-quality starch may be applied. It may also be used as food; but if intended for that purpose it is to be prepared by the second or last process above described for making starch of a lower or secondary quality, with the exception that instead of three or four macerations one only is necessary. In making bread, biscuit, or other articles of food I have found that a very beneficial proportion in which this flour may be mixed with wheaten or other flour is one part of the former to three parts of the latter.

And here I would observe that the process of maceration which I have recommended to be applied to rice in its whole or usual state of commerce I also apply to all grain of a harsh or brittle character.

To make starch from wheat or other similar grain suitable for making starch, I crush or grind it into meal in the usual way. Into a vessel (No. 2) I put a solution of caustic alkali, as before stated, (strength about one hundred grains of real soda or real potash to the gallon,) and to every one hundred gallons of this caustic alkaline solution I add fifty pounds of the meal, taking care to stir it in gradually till the whole is uniformly mixed. This process of stirring should be repeated frequently during about twelve hours, when I allow it to stand seventy hours, or thereabout, to settle or deposit. The first deposit is the outer skin or bran, the second vegetable fiber, and the third starch. The gluten, with traces of other matters, is held in combination with or in solution in the caustic alkaline liquor which is above the deposits, and becomes of a brownish-yellow color. When the starch is deposited, which may be ascertained by the means before mentioned, I draw off the brownish-yellow liquor which is on the top into a vessel (No. 4) without disturbing the starch, for which purpose I use a tin siphon. I then pour on the deposit in the vessel No. 2 as much water as will be requisite to pass it through sieves of the usual description used by starch-manufacturers for separating the bran, and I run the liquor into a vessel in order to separate the starch from the other matters, as before described. The process from this point will be the same as that described under the head of rice-starch.

I shall now describe the method of obtaining the gluten for use.

As soon as the brownish-yellow caustic alkaline liquor containing it is drawn off into vessel No. 4 as much sulpuric acid as will neutralize the alkali is to be cautiously added. The starch-manufacturer will know when he has added a sufficient quantity of acid by using the well-known test of litmus and turmeric papers. I then allow it to stand about twelve hours to settle or deposit, after which I run off the clear top liquid by means of a siphon. The deposit is then mixed with a quantity of clean water equal to what was drawn off, allowed to settle or deposit, and drawn off, as before. The deposit is then to be drained and dried in stoves, then ground or crushed by a mill or by rollers or any other mechanical means used for such purposes, and the flour thus produced may be mixed with wheaten or other flour for bread or biscuit or other articles of food; and I have found that a very beneficial proportion in which this flour may be mixed with wheaten or other flour is one part of the former to three parts of the latter, though other matter than starch which is separated in the manufacture of the better quality of starch may be mixed with the gluten, and the whole drained, dried, ground, and appropriated with the gluten, as above described.

Having thus described the nature of my invention, I would have it understood that although I have been particular in describing the processes and quantities of matter as practiced by me, and which I have found to be the best for giving effect to my invention, I do not confine myself thereto; but

What I claim as my invention is—

1. The mode of treating or operating on farinaceous matters to obtain starch and other products, especially flour or powder produced from rice, and in the manufacture of starch by submitting farinaceous matters to a process or processes of caustic alkaline treatment, as herein described.

2. The mode of manufacturing starch from rice by the process or processes herein described.

ORLANDO JONES.

Witnesses:
  W. W. FISHER,
*Solicitor, 19 Kings Arms Yard, London.*
  CAMPBELL SAFFERY,
*Clerk to Watson & Fisher, of No. 19 Kings Arms Yd., afsd.*